United States Patent [19]
Miller et al.

[11] Patent Number: 5,445,239
[45] Date of Patent: Aug. 29, 1995

[54] MOTOR VEHICLE POWER STEERING SYSTEM

[75] Inventors: Randy S. Miller, Frankenmuth; Brian J. Magnus, Saginaw, both of Mich.

[73] Assignee: General Motors Corporation, Detroit, Mich.

[21] Appl. No.: 283,373

[22] Filed: Aug. 1, 1994

[51] Int. Cl.6 .............................................. B62D 5/08
[52] U.S. Cl. ................... 180/132; 91/375 A; 180/142; 180/143; 180/149
[58] Field of Search ............... 180/132, 141, 142, 143, 180/149; 91/375 A

[56] References Cited
U.S. PATENT DOCUMENTS

| | | | |
|---|---|---|---|
| 3,367,354 | 2/1968 | Gallant | 417/304 |
| 3,881,567 | 5/1975 | Leiber | 180/142 |
| 4,373,871 | 2/1983 | Christ | 417/310 |
| 4,530,414 | 7/1985 | Fukino et al. | 180/142 |
| 4,549,468 | 10/1985 | Trintignac et al. | 91/361 |
| 4,557,342 | 12/1985 | Drutchas | 180/132 |
| 4,570,667 | 2/1986 | Masica et al. | 137/117 |
| 4,586,536 | 5/1986 | Karmel | 137/599 |
| 4,623,031 | 11/1986 | Drutchas et al. | 180/148 |
| 4,627,509 | 12/1986 | Adams et al. | 180/142 |
| 4,629,025 | 12/1986 | Brasier et al. | 180/142 |
| 4,745,985 | 5/1988 | Nakayama et al. | 180/142 |
| 4,760,892 | 8/1988 | Duffy | 180/142 |
| 4,781,262 | 11/1988 | Nakamura et al. | 180/140 |
| 4,828,067 | 5/1989 | Duffy | 180/142 |
| 4,877,099 | 10/1989 | Duffy | 180/142 |
| 4,926,956 | 5/1990 | Duffy | 180/142 |

FOREIGN PATENT DOCUMENTS 56-136855  3/1980  Japan .
2266499A  11/1993  United Kingdom .

Primary Examiner—Mitchell J. Hill
Attorney, Agent, or Firm—Saul Schwartz

[57] ABSTRACT

A motor vehicle power steering system including a hydraulic pump, a fluid motor, and an electronic control valve which regulates boost pressure independent of pump discharge flow rate so that the pump does not require a constant flow valve. The flow area of a throttling orifice which determines the magnitude of boost pressure depends on the magnitude of a pilot pressure in a pilot pressure chamber behind a valve spool of the electronic control valve. The pilot pressure is regulated by a solenoid controlled pintle. The duty cycle of the solenoid is controlled in open-loop fashion by an electronic control module of the power steering system in response to signals from a steering wheel torque sensor of the power steering system. Fluctuations in the discharge flow rate of the hydraulic pump attributable to changes in engine speed induce spool movements to increase or decrease the flow area of the throttling orifice to maintain boost pressure consistent with the scheduled pilot pressure. A direction control valve responds to the direction of steering wheel torque to expose either a right turn or left turn working chamber of the fluid motor to boost pressure.

7 Claims, 3 Drawing Sheets

MOTOR VEHICLE POWER STEERING SYSTEM

FIELD OF THE INVENTION

This invention relates to motor vehicle power steering systems.

BACKGROUND OF THE INVENTION

In motor vehicle power steering systems such as described in U.S. Pat. Nos. 3,022,772 and 4,454,801, issued Feb. 27, 1962 and Jun. 19, 1984, respectively, and assigned to the assignee of this invention, the output of an engine-driven hydraulic pump is throttled at orifices of a proportional control valve to create a steering assist boost pressure in a high pressure fluid circuit upstream of the orifices. The boost pressure reacts against a piston of a fluid motor which, in turn, applies a force supplementing manual steering effort. In the proportional control valve, manual effort applied at a steering wheel rotates a valve spool relative to a valve body against an elastic restoring force of a torsion bar between the two to establish the flow area of the throttling orifices. In the absence of manual effort, the torsion bar locates the valve spool in an open-center position in which the high pressure circuit communicates with a reservoir and fluid circulates freely from the pump to the reservoir at relatively low pressure. To achieve a scheduled relationship between boost pressure and manual effort regardless of pump speed, the engine-driven hydraulic pump has a constant flow valve which depends for its operation on a flow restriction in the high pressure circuit. In the open-center position of the valve spool in which fluid circulates freely in the high pressure circuit, the flow restriction of the constant flow valve needlessly consumes pump energy and, therefore, reduces engine fuel economy. A motor vehicle power steering system according to this invention is an improvement relative to the system described in the aforesaid U.S. Pat. Nos. 3,022,772 and 4,454,801.

SUMMARY OF THE INVENTION

This invention is a new and improved motor vehicle power steering system including a hydraulic pump, a fluid motor, and an electronic control valve which regulates boost pressure independent of pump discharge flow rate so that the pump does not require a constant flow valve. In the electronic control valve, the flow area of a throttling orifice which determines the magnitude of boost pressure depends on the difference between a boost pressure force reacting against one side of a spool and the sum of a pilot pressure force and a spring force reacting against the other side of the spool. The magnitude of the pilot pressure force depends on the duty cycle of a solenoid in the electronic control valve which is scheduled in open-loop fashion by an electronic control module (ECM) of the power steering system in response to signals from a steering wheel torque sensor of the power steering system. Fluctuations in the discharge flow rate of the hydraulic pump attributable to changes in engine speed induce spool movements to increase or decrease the flow area of the throttling orifice to maintain boost pressure consistent with the scheduled pilot pressure. A direction control valve responds to the direction of steering wheel torque to expose either a right turn or left turn working chamber of the fluid motor to boost pressure and the other to a reservoir of the steering system.

DESCRIPTION OF PREFERRED EMBODIMENTS

Figure 1:
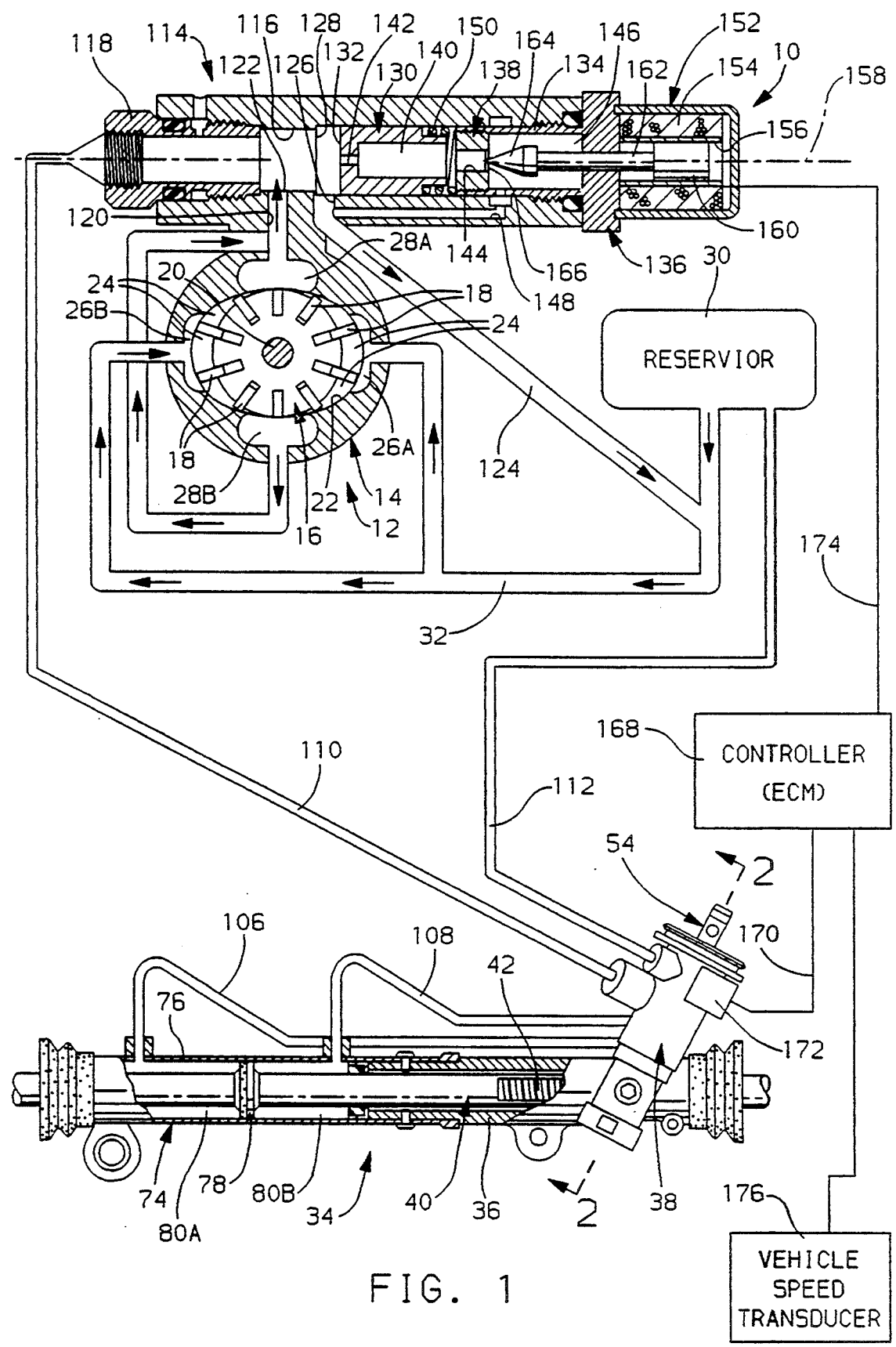
FIG. 1 is a fragmentary schematic view of a motor vehicle power steering system according to this invention.
Figure 2:
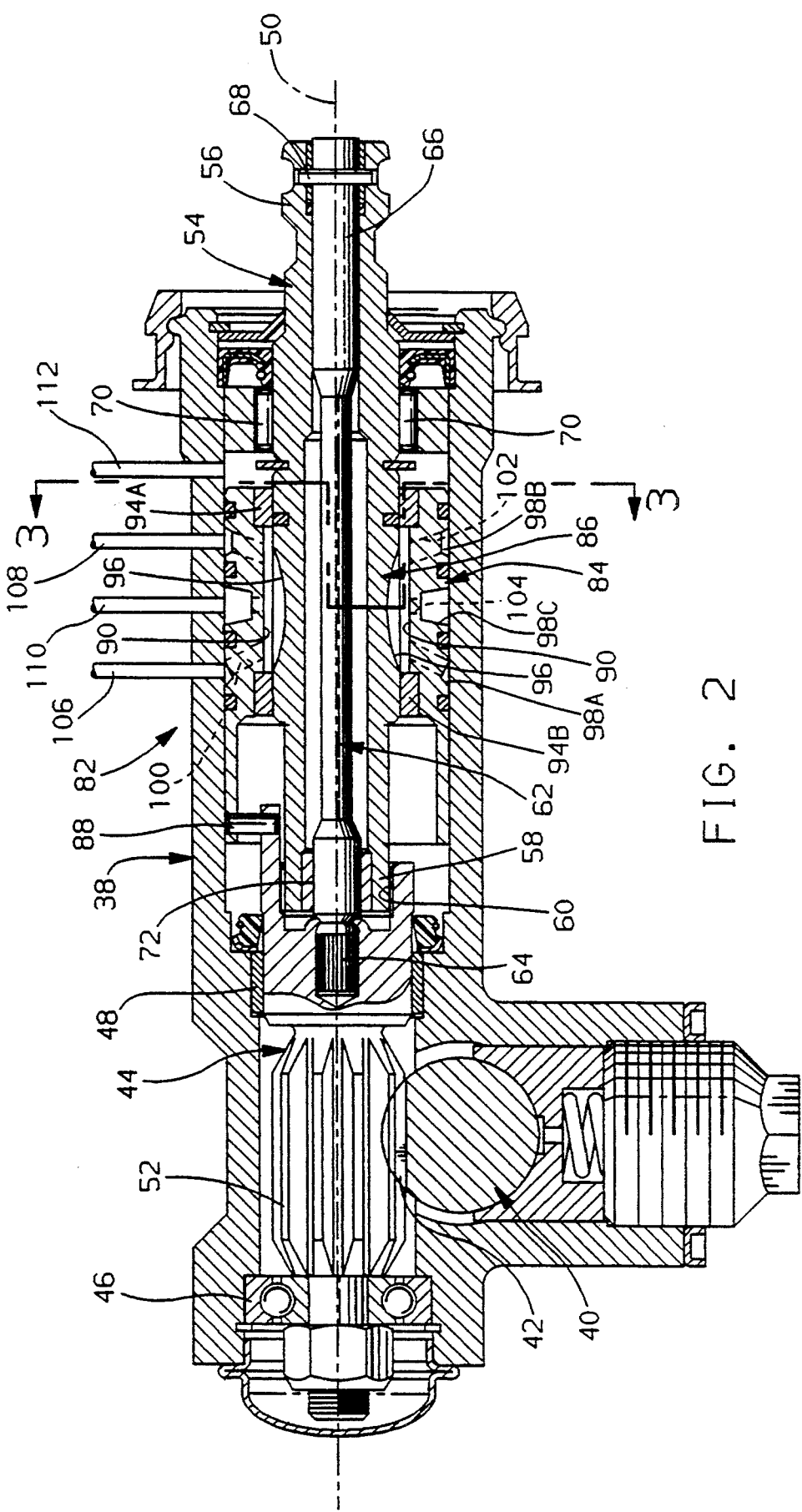
FIG. 2 is an enlarged sectional view taken generally along the plane indicated by lines 2—2 in FIG. 1.
Figure 3:
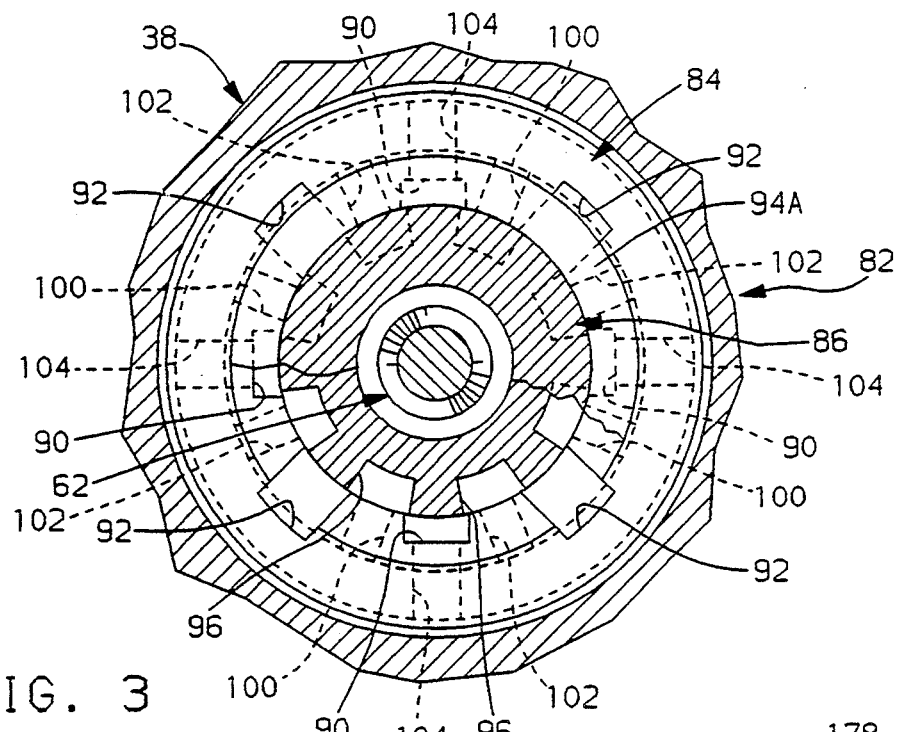
FIG. 3 is a sectional view taken generally along the plane indicated by lines 3—3 in FIG. 2.

Referring to FIGS. 1-3, a motor vehicle power steering system 10 according to this invention includes a balanced, rotary vane hydraulic pump 12 such as described generally in U.S. Pat. No. 4,386,891, issued Jun. 7, 1983 and assigned to the assignee of this invention. The pump 12 has a stationary housing 14, a rotor 16 inside the housing, and a plurality of radial vanes 18 in slots in the rotor. The rotor 16 is rotatably supported on the housing 14 and driven by an engine, not shown, of the motor vehicle at a constant multiple of engine speed through a drive shaft 20.

In conventional rotary vane pump fashion, the distal ends of the vanes 18 bear against an internal cam surface 22 of the housing 14 and cooperate therewith in defining a plurality of pump chambers 24 which expand and collapse twice during each full revolution of the rotor. The expanding pump chambers on opposite sides of the rotor communicate with corresponding ones of a pair of schematically represented inlet ports 26A-B in the pump housing. The collapsing pump chambers on opposite sides of the rotor communicate with corresponding ones of a pair of schematically represented discharge ports 28A-B in the pump housing. The inlet ports 26A-B are in fluid communication with a reservoir 30 through a low pressure supply conduit 32.

A rack and pinion steering gear 34 of the steering system 10 includes a tubular rack housing 36 and an integral valve housing 38. A rack bar 40 having a plurality of rack teeth 42 thereon is supported on the rack housing for back and forth bodily movement in the length direction of the rack housing. Conventional linkage, not shown, connects opposite ends of the rack bar 40 to steerable road wheels of the motor vehicle.

As seen best in FIG. 2, a pinion head 44 is supported on the valve housing 38 by a roller bearing 46 and by a sleeve bearing 48 for rotation about a longitudinal centerline 50 of the valve housing. The pinion head 44 has a plurality of gear teeth 52 thereon which mesh with the rack teeth 42 on the rack bar so that rotation of the pinion head about the centerline 50 effects back and forth bodily movement of the rack bar in the length direction of the rack housing.

A tubular stub shaft 54 of the steering gear has a first end 56 outside the valve housing and a second end 58 inside a counterbore 60 in the pinion head. A torsion bar 62 inside the stub shaft 54 has a serrated first end 64 force fitted into a bore in the pinion head 44 and a second end 66 rigidly connected to the stub shaft at the first end thereof by a pin 68. The stub shaft is supported on the valve housing for rotation about the centerline 50 relative to the valve housing and relative to the pinion head by a plurality of needle bearings 70 and by a sleeve bearing 72. The stub shaft is rotatable as a unit with a steering wheel, not shown, of the motor vehicle through a connection at the first end 56 of the shaft.

Lugs on the pinion head in the counterbore 60 and on the stub shaft at the second end 58 thereof define a lost motion connection which limits relative rotation between the pinion head and the stub shaft to about 3.5 degrees on either side of a center position therebetween defined by the torsion bar in an untwisted or neutral condition thereof. The angle through which the torsion bar twists is proportional to the magnitude of the manually applied steering wheel torque.

A steering assist fluid motor 74 of the steering system 10 includes a sleeve 76 around the rack bar 40 defining an extension of the tubular housing 36. An annular piston 78 on the rack bar 40 engages the inner surface of the sleeve 76 and divides the sleeve into a pair of fluid-tight working chambers 80A-B.

A direction control valve 82 of the steering system 10 in the valve housing 38 is structurally similar to the conventional proportional control valve described in the aforesaid U.S. Pat. No. 3,022,772 and includes a tubular valve body 84 surrounding a valve spool 86 integral with the stub shaft 54. The valve body 84 is connected by a pin 88 to the pinion head 44 for rotation as a unit therewith about the centerline 50 and has a set of shallow internal grooves 90 therein separated by a corresponding set of deep internal grooves 92, all parallel to the centerline 50. As described in the aforesaid U.S. Pat. No. 4,454,801, the shallow grooves 90 are closed at opposite ends by a pair of bearing rings 94A-B force fitted on the ends of the valve body and closely received on the stub shaft and the deep grooves 92 are open on opposite sides of the valve body around the outside diameters of the bearing rings 94A-B.

The valve spool 86 consists of a plurality of arc-shaped slots 96 in the stub shaft facing the valve body between the bearing rings 94A-B. The aforesaid centered position of the stub shaft relative to the pinion head defines a corresponding open-center position of the valve spool 86 relative to the valve body 84 in which the slots 96 in the valve spool are centered between pairs of deep grooves 92 and shallow grooves 90 in the valve body and overlap both by about 0.004 inch. The overlaps between the slots 96 and the grooves 90,92 define a corresponding plurality of slit-like or linear flow orifices, half of which open further and half of which close completely at essentially the very onset of relative rotation between the stub shaft 54 and the pinion head 44 in either direction.

As seen best in FIGS. 2-3, the valve body 84 has a plurality of outward opening annular grooves 98A-B-C facing the inner wall of the valve housing 38 and fluid sealed relative to each other by a plurality of seal rings bearing against the valve body. The annular groove 98A communicates with a first set of the arc-shaped slots 96 in the valve spool constituting every other one of the slots through a plurality of generally radial passages 100. The groove 98B communicates with a second set of the arc-shaped slots 96 in the valve spool constituting the remaining every other one of the slots through a plurality of generally radial passages 102. The annular groove 98C communicates with each of the shallow internal grooves 90 in the valve body through a plurality of radial passages 104.

The annular groove 98A communicates with the working chamber 80A of the fluid motor 74 through a first tube 106. The annular groove 98B communicates with the working chamber 80B of the fluid motor 74 through a second tube 108. The annular groove 98C communicates with the pump 12 through a high pressure conduit 110. The deep internal grooves 92 communicate with the reservoir 30 around the outside of the bearing rings 94A-B and through a low pressure conduit 112 open to the valve housing 38 outside of the valve body 84.

As seen best in FIG. 1, an electronic pressure control valve 114 of the steering system 10 includes a bore 116 in the housing 14 of the pump having a screw threaded union 118 at one end thereof for the high pressure conduit 110 so that the bore 116 constitutes the upstream end of the high pressure conduit. A passage 120 in the pump housing 14 in flow communication with the discharge ports 28A-B intersects the bore 116 at a high pressure port 122 of the pump. A low pressure recirculating conduit 124 intersects the bore 116 at an exhaust port 126 and is connected to the inlet ports 26A-B of the pump through the low pressure supply conduit 32. The bore 116 has an annular shoulder 128 therein between high pressure port 122 and the exhaust port 126.

A cylindrical, cup-shaped spool 130 of the pressure control valve 114 is closely received in the bore 116 and slidable back and forth between a closed position, not shown, against the shoulder 128 and an open position, FIG. 1, separated from the shoulder. An edge 132 of the spool 130 defines a valve land which substantially completely closes the exhaust port 126 in the closed position of the spool and which substantially completely exposes the exhaust port in the open position of the spool. Between the open and closed positions of the valve spool, the edge 132 cooperates with the edge of the exhaust port in defining a variable flow area throttling orifice at the very upstream end of the high pressure conduit 110.

A tubular portion 134 of a solenoid base 136 is connected by screw threads to the pump housing 14 such that the base closes the end of the bore 116 opposite the union 118. An orifice plate 138 is mounted on the innermost end of the tubular portion 134 and cooperates with the spool 130 in defining a pilot pressure chamber 140 on the opposite side of the spool from the upstream end of the high pressure conduit 110. A supply orifice 142 in the spool 130 affords communication between the pilot pressure chamber 140 and the upstream end of the high pressure conduit 110. A cylindrical bore 144 in the orifice plate 138 affords communication between the pilot pressure chamber 140 and a low pressure exhaust chamber 146 connected to the recirculation conduit 124 downstream of the exhaust port 126 by an internal passage 148. A spring 150 between the spool 130 and the orifice plate 138 biases the spool toward its closed position.

A schematically represented solenoid 152 of the pressure control valve 114 includes a wire coil 154 on the base 136 around a tubular guide 156 aligned on a centerline 158 of the bore 116. An armature 160 of the solenoid 152 is supported in the guide 156 for back and forth bodily movement in the direction of the centerline 158. A pintle 162 is connected to the armature 160 for bodily movement as a unit therewith and includes a conical end 164 which cooperates with the bore 144 in the orifice plate 138 in defining an annular, variable flow area pilot pressure throttling orifice 166 between the pilot pressure chamber 140 and the exhaust chamber 146. The flow area of the annular orifice 166 is minimum in an extended position of the armature 160, not shown, characterized by maximum penetration of the conical end 164 of the pintle into the bore 144. The flow area of the annular orifice 166 is maximum in a retracted position of the armature 160, FIG. 1, characterized by essentially complete withdrawal of the conical end 164 from the bore 144.

An electronic control module (ECM) 168 of the power steering system 10 is connected by a conductor 170 to a steering wheel torque sensor 172 on the valve housing 38 of the steering gear 34 which provides an electrical signal to the ECM proportional to manual effort applied at the steering wheel of the motor vehicle. The torque sensor 172 may be of the gap sensing type or of any other conventional construction. The ECM is connected by a conductor 174 to the wire coil 154 of the solenoid. The ECM controls the strength of the magnetic field induced by the wire coil urging the armature 160 toward its extended position by varying the duty cycle of the solenoid, i.e. by turning on and off at varying frequency an electric current in the wire coil, in accordance with an internal schedule relating such duty cycle to steering wheel torque as sensed by the torque sensor 172.

With the engine of the motor vehicle operating and the pump 12, therefore, discharging fluid into the bore 116 through the high pressure port 122 at a flow rate which varies with the speed of the engine, two operating modes of the steering system 10 are observed depending upon whether or not manual steering torque is being applied at the steering wheel. In a first operating mode, i.e. zero steering wheel torque, the torsion bar 62 effects the centered position of the stub shaft 54 relative to the pinion head 44, and the corresponding open-center position of the valve spool 86 relative to the valve body 84, and the ECM turns the solenoid off 152 so there is no magnetic flux biasing the armature toward its extended position. In the second operating mode, i.e. manually applied right of left turn steering wheel torque, the torsion bar is twisted through an angle proportional to applied steering wheel torque and the ECM, in accordance with the corresponding signal from the steering wheel torque sensor 172, energizes the solenoid at a scheduled duty cycle.

Describing, further, the first operating mode, when the valve spool 86 is in its open-center position, the aforesaid linear flow orifices between the valve spool and valve body 84 permit fluid to circulate from the bore 116 to the reservoir 30 through the high pressure conduit 110, the direction control valve 82, and the low pressure conduit 112. A back pressure of about 32 psi develops in the bore 116 due to flow restriction at the linear orifices and friction in the various conduits of the system. Such back pressure reacts against the valve spool 130 in the bore 116 and shifts the latter to its open position exposing the exhaust port 126 in the bore. In that circumstance, a large first fraction of the fluid discharged from the pump 12 flows directly back to the inlet ports 26A-B of the pump through the exhaust port 126 against comparatively little back pressure while the small remaining second fraction of pump discharge circulates to the reservoir through the flow directing valve. Because the first fraction greatly exceeds the second fraction and back pressure is very low, relatively little pump energy is expended in the first operating mode as compared to prior systems having flow restricting constant flow valves.

In the second operating mode, the direction control valve 82 assumes one or the other of two off-center positions depending upon the direction of applied steering wheel torque. That is, one of the two sets of linear orifices between the valve spool 86 and the valve body 84 closes within the first two degrees of torsion bar twist while the other set opens wider. The closing set of orifices severs the connection between the high pressure conduit 110 and the reservoir 30 and connects the high pressure conduit solely to a corresponding one of the working chambers 80A-B of the fluid motor 74. The opening set of linear orifices maintains a fluid flow path between the reservoir and the other of the working chambers of the fluid motor to accommodate drainage of fluid therefrom to the reservoir.

As the aforesaid one set of linear orifices closes, the magnetic flux induced by the wire coil 154 of the solenoid 152 under the control of the ECM 168 applies a bias force on the armature 160 toward its extended position. Because these two events occur essentially simultaneously, the conical end 164 of the pintle 162 initially substantially closes the annular orifice 166 so that fluid pressure in the pilot pressure chamber 140 equals fluid pressure in the bore 116 at the upstream end of the high pressure conduit 110. In that circumstance, the spring 150 shifts the valve spool 130 to its closed position blocking the exhaust port 126 so that fluid pressure, i.e. boost pressure, increases rapidly in the bore 116 and in the high pressure conduit 110 and the one of the working chambers 80A-B connected thereto.

Boost pressure in the working chamber connected to the high pressure conduit reacts against the annular piston 78 on the rack bar 40 and induces thereon a fluid pressure force supplementing the steering force applied manually to the rack bar from the steering wheel through the stub shaft 54, the torsion bar 62, and the pinion head 44. Since boost pressure also initially prevails in the pilot pressure chamber 140, the conical end 164 of the pintle 162 experiences a pressure force reaction opposing the bias of the magnetic flux induced by the wire coil 154.

When the pressure force on the conical end 164 exceeds the magnetic flux bias, the armature 160 is shifted back toward its retracted position, the annular orifice 166 expands so that fluid drains from the pilot pressure chamber to the reservoir, and pilot pressure decreases to below boost pressure in the bore 116. The pressure imbalance between the bore 116 and the pilot pressure chamber 140 shifts the valve spool 130 toward its open position to partially expose the exhaust port 126 to the bore 116 and initiate recirculation of a fraction of the fluid discharge from the pump 12 back to the inlet ports 26A-B thereof so that boost pressure ceases to increase.

If the duty cycle of the solenoid 152 is unchanged by the ECM, i.e. steering wheel torque remains constant, the land 132 of the valve spool 130 regulates a boost pressure in the bore 116 proportional to the magnitude of the magnetic bias induced by the wire coil 154 on the armature 160. If engine speed increases, then the corresponding increase in fluid discharge from the pump 12 induces a momentary increase in boost pressure which shifts the valve spool 130 further toward its open position allowing additional fluid to recirculate back to the inlet ports 26A-B of the pump to reduce boost pressure back to the aforesaid magnitude proportional to the magnitude of the magnetic bias induced by the wire coil on the armature. If engine speed decreases, the opposite occurs and the flow area of the throttling orifice defined between the valve spool 130 and the exhaust port 126 decreases to reduce the fraction of pump discharge recirculated to the pump inlet ports.

When the duty cycle of the solenoid 152 is changed by the ECM due to a change in steering wheel torque, the magnitude of the magnetic bias induced by the wire coil 154 on the armature 160 changes accordingly. If steering wheel torque increases, for example, the magnetic bias increases and the conical end 164 of the pintle 162 reduces the flow area of the annular orifice 166. In that circumstance, fluid pressure in the pilot pressure chamber 140 increases so that the valve spool 130 is shifted toward its closed position until equilibrium is reestablished at a higher boost pressure. If steering wheel torque decrease, the opposite occurs and the valve spool 130 regulates a lower boost pressure.

A vehicle speed transducer 176 may, optionally, provide a second electronic signal to the ECM corresponding to vehicle speed. The schedule in the ECM relating solenoid duty cycle to steering wheel torque may, in that circumstance, be modified to accommodate desired handling characteristics for different vehicle speeds such as less power assist at high vehicle speed and more power assist at low vehicle speed.

Figure 4:
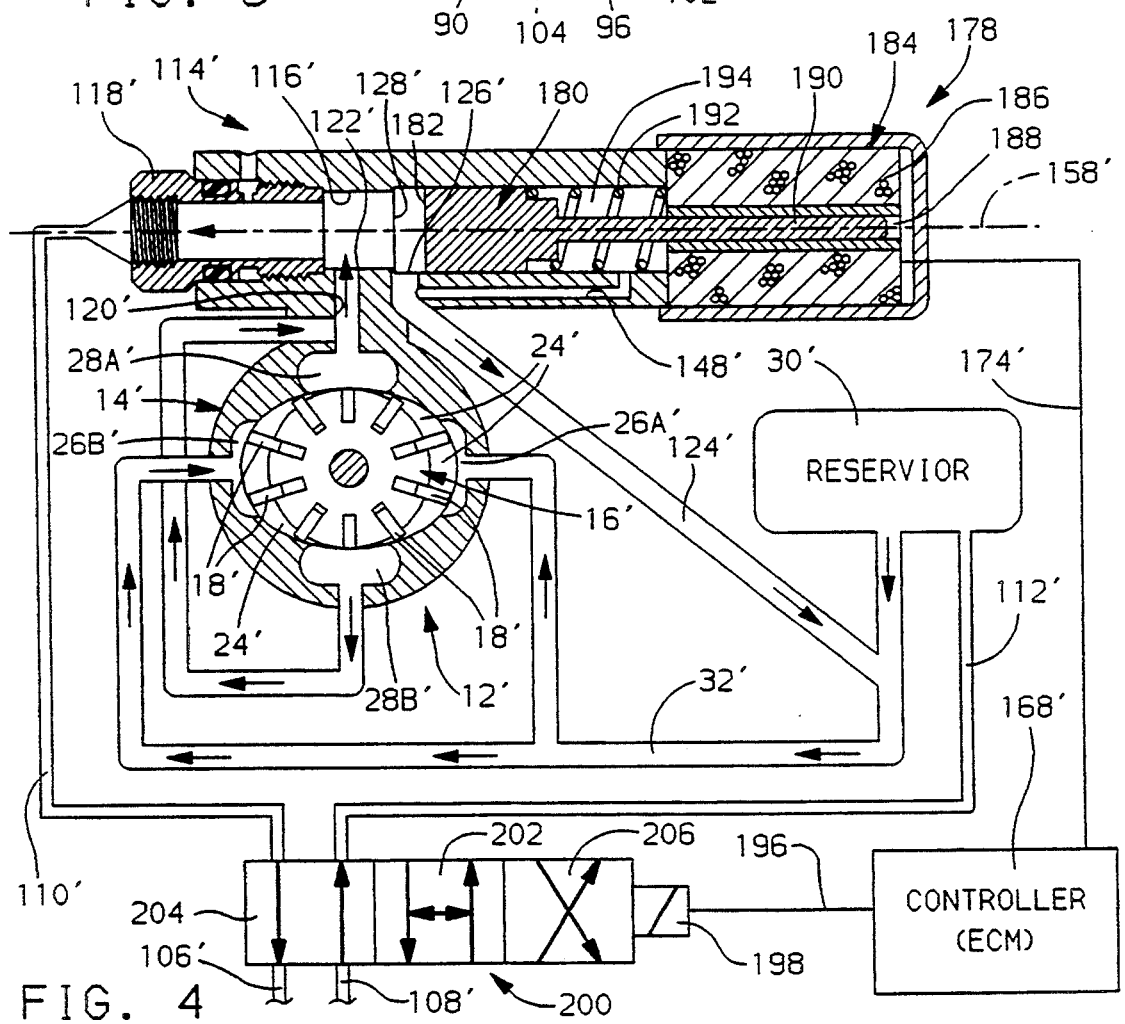
FIG. 4 is similar to FIG. 1 and illustrates a modified motor vehicle power steering system according to this invention.

A modified steering system 178 according to this invention is fragmentarily illustrated in FIG. 4 wherein elements common to both steering systems 10 and 178 are identified by primed reference characters. The modified steering system 178 includes a balanced, rotary vane hydraulic pump 12' having a stationary housing 14', a rotor 16' inside the housing, and a plurality of radial vanes 18' in slots in the rotor. The rotor is rotatably supported on the housing and driven by an engine, not shown, of the motor vehicle at a constant multiple of engine speed.

The vanes 18' bear against an internal cam surface of the housing 14' and cooperate therewith in defining a plurality of pump chambers 24' which expand and collapse twice during each full revolution of the rotor. The expanding pump chambers communicate with corresponding ones of a pair of schematically represented inlet ports 26A'–B' in the pump housing. The collapsing pump chambers communicate with corresponding ones of a pair of schematically represented discharge ports 28A'–B' in the pump housing. The inlet ports are in fluid communication with a reservoir 30' through a low pressure supply conduit 32'.

An electronic pressure control valve 114' of the steering system 178 includes a bore 116' in the housing 14' of the pump having a screw threaded union 118' at one end thereof for a high pressure conduit 110' so that the bore 116' constitutes the upstream end of the high pressure conduit. A passage 120' in the pump housing in flow communication with the discharge ports 28A'–B' intersects the bore 116' at a high pressure port 122' of the pump. A low pressure recirculating conduit 124' intersects the bore 116' at an exhaust port 126' and is connected to the inlet ports 26A'–B' of the pump through the low pressure supply conduit 32'. The bore 116' has an annular shoulder 128' therein between high pressure port 122' and the exhaust port 126'.

A solid cylindrical spool 180 of the pressure control valve 114' is closely received in the bore 116' and slidable back and forth between a closed position, not shown, against the shoulder 128' and an open position, FIG. 4, separated from the shoulder. An edge 182 of the spool 180 defines a valve land which substantially completely closes the exhaust port 126' in the closed position of the spool and which substantially completely exposes the exhaust port in the open position of the spool. Between the open and closed positions of the valve spool, the edge 182 cooperates with the edge of the exhaust port in defining a variable flow area throttling orifice at the very upstream end of the high pressure conduit 110'.

A schematically represented solenoid 184 of the pressure control valve 178 closes the end of the bore 116' opposite the union 118' and includes a wire coil 186 around a tubular guide 188 aligned on a centerline 158' of the bore 116'. An armature 190 of the solenoid 184 is supported in the guide 188 for back and forth bodily movement in the direction of the centerline 158' and is rigidly connected to the solid spool 180. A spring 192 in a spring chamber 194 biases the spool 180 toward its closed position. The spring chamber 194 drains to the recirculation conduit 124' downstream of the exhaust port 126' through a passage 148'.

An electronic control module (ECM) 168' of the power steering system 178' is connected to a steering wheel torque sensor, not shown, corresponding to the sensor 172 described above which provides an electrical signal to the ECM proportional to manual effort applied at the steering wheel of the motor vehicle. The ECM is connected by a conductor 174' to the wire coil 186 of the solenoid. The ECM controls the strength of the magnetic field around the wire coil 186 urging the armature 190 toward its extended position by varying the duty cycle of the solenoid in accordance with an internal schedule relating such duty cycle to steering wheel torque as sensed by the torque sensor.

The ECM is connected by a conductor 196 to an actuator 198 of a three-position, electronic direction control valve 200 of the steering system 178. The control valve is connected on one side the high pressure conduit 110' and to a low pressure return conduit 112' and on the other side to a pair of hoses 106', 108' connected to the working chambers of a fluid motor, not shown, corresponding to the fluid motor 74 described above. In a first or open-center position of the valve 200 represented by a schematic box 202, both conduits 110',112' are in fluid communication with both hoses 106',108'. In a second position of the valve 200 represented by a schematic box 204, the high pressure conduit 110' is connected to only the hose 106' and the low pressure conduit is connected only to the hose 108'. In a third position of the valve 200 represented by a schematic box 206, the high pressure conduit 110' is connected to only the hose 108' and the low pressure conduit 112' is connected only to the hose 106'.

The modes of operation of the steering system 178 are the same as those of the above described steering system 10 except as follows. First, the ECM controls the actuator 198 of the direction control valve 200 to achieve the one of the three positions 202,204,206 thereof in accordance with the signal from the steering wheel torque sensor. If steering wheel torque is zero, then the direction control valve is in its open-center position 202. If left turn steering wheel torque is sensed, then the direction control valve is in the corresponding one of the remaining two positions 204,206. If right turn steering wheel torque is sensed, then the direction control valve is in the other of the remaining two positions 204,206.

Second, the fluid pressure force on the valve spool 180 due to boost pressure in the bore 116' is balanced directly by the magnetic bias induced by the wire coil 186 on the armature 190 instead of by a pilot pressure force in a pilot pressure chamber on the opposite side of the valve spool from the bore 116'. However, since the force exerted on the spool 180 by the armature 190 must be of the same order of magnitude as the pressure force on the spool due to boost pressure in the bore 116, the solenoid 184 in the power steering system 178 must be considerably larger and more powerful than the solenoid 152 in the power steering system 10.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A motor vehicle power steering system comprising:
   an engine-drive hydraulic pump discharging fluid through a high pressure port of said pump at a flow rate varying with engine speed,
   a steering gear having a first rotatable member connected to a manual steering wheel whereat a steering wheel torque is applied and a second rotatable member connected to a pair of steered wheels,
   a fluid motor connected to said pair of steered wheels having a first working chamber,
   means defining a high pressure conduit between said high pressure port and said first working chamber,
   means defining a recirculation conduit connected to an inlet port of said pump and intersecting said high pressure conduit at an exhaust port,
   a valve spool in said high pressure conduit cooperating with said exhaust port in defining a variable flow area throttling orifice between said high pressure conduit and said recirculation conduit and shiftable in a first pressure reducing direction in response to a fluid pressure force on a first side of said valve spool induced by a fluid pressure in said high pressure conduit and in a second pressure increasing direction,
   an electronic solenoid having a duty cycle varying between a maximum and a minimum and an armature subjected to a magnetic bias force having a magnitude proportional to said duty cycle of said solenoid,
   an actuator means between said valve spool and said armature of said solenoid operative to exert on said valve spool a regulating force in said second pressure increasing direction having a magnitude proportional to said magnitude of said magnetic bias force on said armature so that a fluid boost pressure is regulated in said high pressure conduit proportional to said magnetic bias force, and
   an open-loop control means for said electronic solenoid including a first transducer connected to said first rotatable element of said steering gear providing an electronic signal indicative of the magnitude and the direction of said steering wheel torque, and
   an electronic control module connected to said first transducer and to said electronic solenoid operative to schedule a predetermined duty cycle of said solenoid in accordance with an internal schedule based on said electronic signal from said first transducer so that said valve spool regulates a fluid boost pressure in said high pressure conduit based on the magnitude of said steering wheel torque sensed by said first transducer.

2. The motor vehicle power steering system recited in claim 1 wherein said actuator means between said valve spool and said armature of said solenoid operative to exert on said valve spool a regulating force in said second pressure increasing direction includes:
   means defining a pilot pressure chamber exposed to a second side of said valve spool,
   an orifice means affording fluid communication between said high pressure conduit and said pilot pressure chamber,
   means defining a variable flow area throttling orifice between said pilot pressure chamber and said recirculation conduit including a stationary member and a moveable member shiftable in a pilot pressure increasing direction and in a pilot pressure reducing direction, and
   means rigidly connecting said moveable member to said armature of said solenoid such that said magnetic bias force on said armature urges said moveable member in said pilot pressure increasing direction.

3. The motor vehicle power steering system recited in claim 1 wherein said actuator means between said valve spool and said armature of said solenoid operative to exert on said valve spool a regulating force in said second pressure increasing direction includes:
   a pintle rigidly connected to said valve spool and to said armature of said solenoid so that said magnetic bias force on said armature urges said valve spool in said second pressure increasing direction.

4. The motor vehicle power steering system recited in claim 1 further including:
   a second working chamber in said fluid motor,
   a direction control valve connected to said high pressure conduit and to each of said first and said second working chambers such that said first and said second working chambers are both connected to said high pressure conduit in an open-center position of said direction control valve and only said first working chamber is connected to said high pressure conduit in a first off-center position of said direction control valve and only said second working chamber is connected to said high pressure conduit in a second off-center position of said direction control valve, and
   means connecting said direction control valve to a reservoir of said steering system such that said first and said second working chambers are both connected to said reservoir in said open-center position of said direction control valve and only said second working chamber is connected to said reservoir in said first off-center position of said direction control valve and only said first working chamber is connected to said reservoir in said second off-center position of said direction control valve.

5. The motor vehicle power steering system recited in claim 4 wherein said direction control valve includes:
   a rotary valve spool integral with said first rotatable element of said steering gear having a plurality of arc-shaped slots therein,
   a rotary valve body around said valve spool connected to said second rotatable element of said steering gear for rotation as a unit therewith having a plurality of internal grooves facing said am-shaped slots and cooperating therewith in defining a first set of linear flow orifices which are closed in said first off-center position of said direction control valve and open in each of said open-center position and said second off-center position of said direction control valve and a second set of linear flow orifices which are closed in said second off-center position of said direction control valve and open in each of said open-center position and said first off-center position of said direction control valve, and a torsion bar between said first rotatable element of said steering gear and said second rotatable element of said steering gear effecting said open-center position of said direction control valve when the magnitude of said steering wheel torque is zero.

6. The motor vehicle power steering system recited in claim 4 wherein said direction control valve includes:

an electronic actuator means connected to said direction control valve and to said electronic control module operative to effect said open-center position of said direction control valve when the magnitude of said steering wheel torque sensed by said first transducer is zero and to effect said first off-center position of said direction control valve when the direction of said steering wheel torque sensed by said first transducer is a first direction and to effect said second off-center position of said direction control valve when the direction of said steering wheel torque sensed by said first transducer is a second direction opposite to said first direction.

7. The motor vehicle power steering system recited in claim 1 further including:

a second transducer connected to said electronic control module providing an electronic signal indicative of the speed of said motor vehicle, said electronic control module being operative to schedule a predetermined duty cycle of said solenoid in accordance with an internal schedule based on said electronic signals from each of said first and said second transducers so that said valve spool regulates a fluid boost pressure in said high pressure conduit based on the magnitude of said steering wheel torque sensed by said first transducer and the speed of said motor vehicle sensed by said second transducer.

* * * * *